United States Patent
Croak et al.

(10) Patent No.: US 7,609,830 B1
(45) Date of Patent: Oct. 27, 2009

(54) METHOD AND APPARATUS FOR ACCESS TO DIALING PLANS FOR USERS OF DISTINCT ENTERPRISE NETWORKS

(75) Inventors: Marian Croak, Fair Haven, NJ (US); Hossein Eslambolchi, Los Altos Hills, CA (US)

(73) Assignee: AT&T Corporation, New York, NY (US)

( * ) Notice: Subject to any disclaimer, the term of this patent is extended or adjusted under 35 U.S.C. 154(b) by 901 days.

(21) Appl. No.: 10/951,136

(22) Filed: Sep. 27, 2004

(51) Int. Cl.
*H04M 3/42* (2006.01)
*H04M 11/00* (2006.01)
*H04M 7/00* (2006.01)

(52) U.S. Cl. .............. 379/201.01; 379/93.07; 379/220.01

(58) Field of Classification Search ............ 379/220.01, 379/201.01, 93.07
See application file for complete search history.

(56) References Cited

U.S. PATENT DOCUMENTS

| | | | | |
|---|---|---|---|---|
| 5,974,133 A * | 10/1999 | Fleischer et al. | ............. | 379/230 |
| 6,154,533 A * | 11/2000 | Foelker | ................. | 379/201.01 |
| 2003/0144013 A1* | 7/2003 | Benchetrit et al. | ........... | 455/461 |
| 2005/0026648 A1* | 2/2005 | Belkin et al. | ............. | 455/552.1 |
| 2005/0105497 A1* | 5/2005 | Belkin et al. | ................. | 370/338 |
| 2007/0110078 A1* | 5/2007 | De Silva et al. | ........ | 370/395.53 |

* cited by examiner

*Primary Examiner*—Rasha S Al Aubaidi

(57) ABSTRACT

The invention comprises a method and apparatus for processing a call request from a first enterprise customer network to a second enterprise customer network using at least one dialing plan. Specifically, the method comprises receiving at least one dialing plan request from a first network endpoint in the first enterprise customer network for accessing a second network endpoint in the second enterprise customer network, retrieving at least one dialing plan mapping in response to the at least one dialing plan request, and responding to the at least one dialing plan request using the at least one dialing plan mapping.

19 Claims, 4 Drawing Sheets

METHOD AND APPARATUS FOR ACCESS TO DIALING PLANS FOR USERS OF DISTINCT ENTERPRISE NETWORKS

FIELD OF THE INVENTION

The invention relates to the field of communications networks, and more specifically, to a method for providing users of distinct enterprise networks access to dialing plans.

BACKGROUND OF THE INVENTION

An enterprise network is a large customer network including a vast array of networking equipment (often geographically dispersed) requiring the ability to communicate and share information. An enterprise customer (such as Intel, IBM, and the like) typically subscribes to specific service plans such that each time a user comes online in the enterprise customer network, the user is provisioned to have access to services in service plans to which the enterprise customer subscribes. The services provided in the service plans may include three-digit dialing, four-digit dialing, five-digit dialing, star-nine dialing (i.e., dialing "*9" for international), call waiting, call forwarding, teleconferencing capabilities, voicemail, and a wide variety of other services and dialing plans offered by most service providers.

Since enterprise customers typically have different telecommunication services and application needs, the services and dialing plans subscribed to by an enterprise customer are typically particular to that enterprise customer, and often vary across enterprise customers. As such, a service provider supporting a plurality of enterprise customers typically hosts a large embedded base of public and private dialing plans. The service plans and associated dialing plans of an enterprise customer are private and cannot currently be accessed across distinct enterprise customer networks.

A service provider typically packages particular services, dialing plans, and other features into service offerings that span a wide variety of services that may be required by an enterprise customer (such as time division multiplexing (TDM) services, Internet Protocol (IP) services, international services, and the like). As such, specific dialing plans are often embedded within a particular service offering in order to enable the enterprise customer users to use the services provided in the particular service offering. In general, a dialing plan provides specialized routing associated with specialized services to which an enterprise customer subscribes.

Unfortunately, the embedding of specific dialing plans within service offerings requires that an enterprise customer subscribe to a full service offering in order to obtain one particular dialing plan. For example, if a US-based enterprise customer requires a four-digit dialing plan, but the service provider has included the four-digit dialing plan within an international service offering, the US-based enterprise customer must subscribe to the entire international service offering in order to utilize the four-digit-dialing dialing plan. As a result, network endpoints are often unable to utilize particular dialing plans.

Furthermore, in the case of multiple distinct enterprise customers, when a user of one enterprise customer network establishes a connection with a user of another enterprise customer network using an IP network, that connection is transferred to and carried over a public switched telephone network (PSTN). This is even the case for a situation in which both enterprise customer networks are using a common IP network. In other words, since each enterprise customer network is treated as a private network with respect to other enterprise customer networks, in order to complete a call between enterprise customer networks the call must be transferred through another intermediate network (e.g., a PSTN). This further exacerbates the capability of network endpoints to initiate call requests across enterprise customer networks using dialing plans.

As such, a need exists in the art for a method of processing call requests from a first enterprise customer network to a second enterprise customer network, such that network endpoints within one enterprise customer network have the ability to initiate call requests to network endpoints within a different enterprise customer network.

SUMMARY OF THE INVENTION

In one embodiment, the invention comprises a method and apparatus for processing a call request from a first enterprise customer network to a second enterprise customer network using at least one dialing plan. Specifically, the method comprises receiving at least one dialing plan request from a first network endpoint in the first enterprise customer network for accessing a second network endpoint in the second enterprise customer network, retrieving at least one dialing plan mapping in response to the at least one dialing plan request, and responding to the at least one dialing plan request using the at least one dialing plan mapping.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a service provider network supporting two distinct enterprise customer networks; however, the methodology of the invention can readily be applied to other network topologies. In general, the present invention enables network endpoints in distinct enterprise customer networks to initiate call requests using at least one dialing plan. In other words, instead of having a dialing plan tightly embedded within a particular service, or only available for calls within a particular enterprise customer network, a central repository of dialing plans is established such that dialing plans available to one enterprise customer network are mapped to dialing plans available to a different enterprise customer in order to enable the initiation of call requests between distinct enterprise customers using dialing plans.

Furthermore, using the methodology of the present invention, the service provider enables establishment of a connection between network endpoints of different enterprise customers while obviating the need for the connection to traverse an intermediate network such as a PSTN. In other words, using the methodology of the present invention, a service provider enables calls between distinct enterprise customer networks to be treated as on-network calls from the perspective of each of the distinct enterprise customers (i.e., using a common IP network to which the distinct enterprise customer networks are connected).

Figure 1:
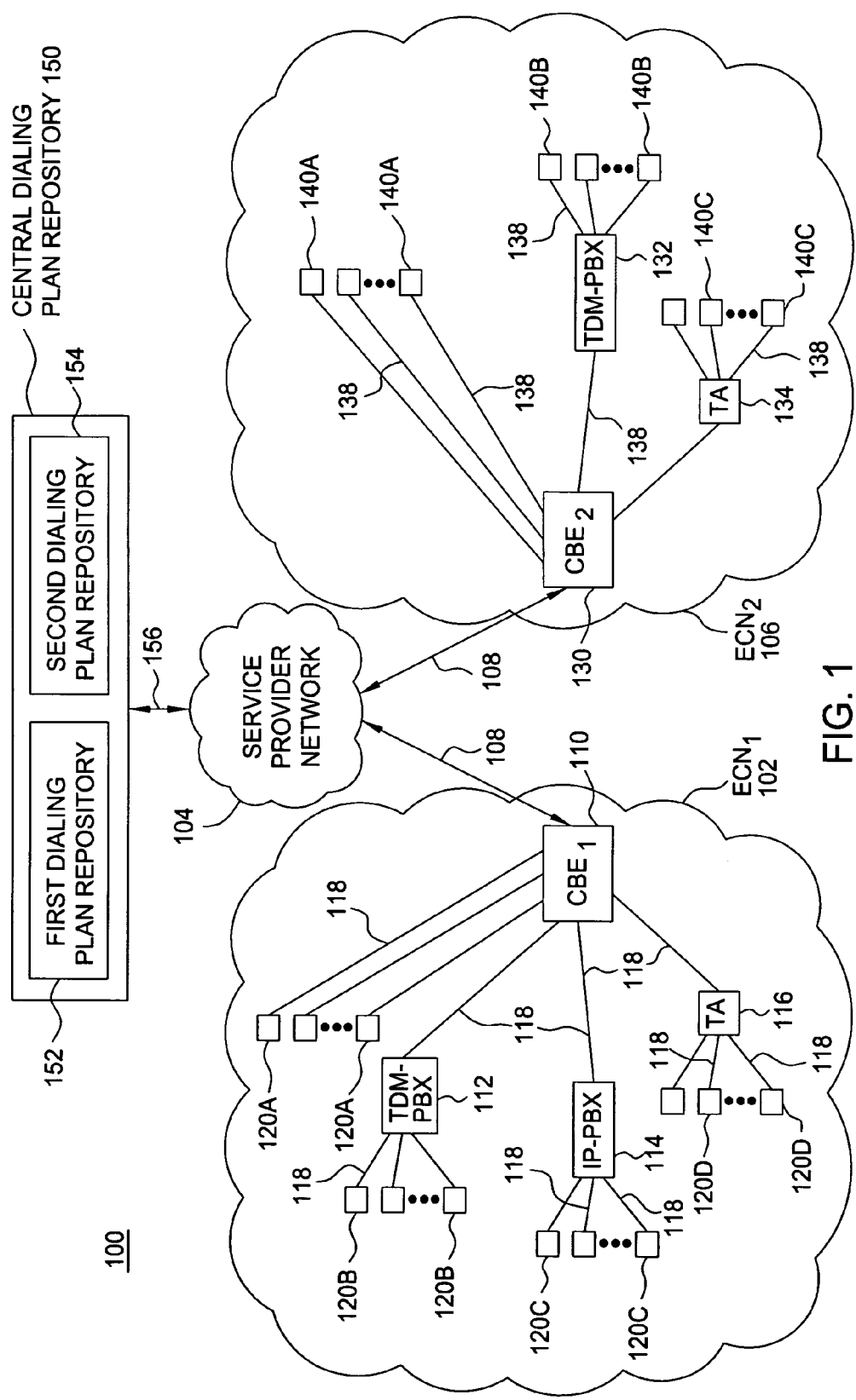
FIG. 1 depicts a communication architecture including a plurality of network endpoints within two enterprise customer networks.

FIG. 1 depicts a communication architecture including a plurality of network endpoints within two enterprise customer networks. Specifically, the communication architecture 100 of FIG. 1 comprises a first enterprise customer network (ECN$_1$) 102, a service provider network 104, a second enterprise customer network (ECN$_2$) 106, and a central dialing plan repository 150. The first enterprise customer network 102 and second enterprise customer network 106 communicate with the service provider network 104 via the communication links 108. Although only two communication links 108 are depicted, additional communication links may be used to facilitate communication with the service provider network 104.

Although not depicted, those skilled in the art will appreciate that service provider network 104 comprises numerous network gateway and peer network border elements, core equipment, and associated communication links for carrying information across the service provider network 104. Furthermore, although not depicted, service provider network 104 may include call control elements, media servers, common network control functions such as call admission control, network routing engines, service brokers, user profile engines, and the like.

The first enterprise customer network 102 comprises a first customer border element (CBE$_1$) 110 and a plurality of network endpoints 120A-120D (collectively, network endpoints 120) connected via first enterprise customer network communication links 118, as well as intervening equipment. A customer border element is a network element (such as a router, switch, and the like) through which network endpoints in an enterprise customer network typically connect to a service provider's backbone network (illustratively, service provider network 104). A customer border element typically performs functions such as routing, switching, admission control, and the like.

A network endpoint is typically a user terminal (such as a phone, computer, and the like) by which one or more users communicate with other users of the same enterprise customer network or users of a different enterprise network. The network endpoints 120 communicate with the first customer border element 110 via first enterprise customer network communication links 118. Since each of the network endpoints 120 is provisioned as part of the first enterprise customer network 102, each of the network endpoints 120 is able to send and receive information from every other network endpoint 120. Since each of the network endpoints 120 belongs to first enterprise customer network 102, and may therefore be geographically dispersed, each of the network endpoints 120 may communicate with the service provider network 104 via the first customer border element 110.

A network endpoint (such as a TDM phone, an IP phone, an ISDN phone, a computer, and the like) typically establishes a connection with a service provider network via a customer border element and a provider border element (not depicted). In general, large enterprise customer locations are provided with dedicated access to the service provider network using leased lines, frame relay (FR), asynchronous transfer mode (ATM), and like access technologies. The enterprise customer network endpoints in small branch offices and remote locations are typically provided access to the service provider network using shared access technologies such as independent local exchange carrier (ILEC) service, digital subscriber line (DSL) service, cable modem service, and the like.

The TDM access from a network endpoint to a service provider network may be implemented via edge signaling, direct access, IP direct access (using a direct-access line shared with an IP data service), and the like. In one embodiment, a network endpoint (such as a time division multiplexing (TDM) phone) connects to a border element via a TDM Private Branch Exchange (PBX). For example, as depicted with respect to the first enterprise customer network 102, the network endpoints 120B are connected to first customer border element 110 via TDM-PBX 112 and associated first enterprise customer network communication links 118.

The IP access from a network endpoint to a service provider network may be implemented via a customer managed router, a Terminal Adapter (TA), and like IP access technologies. In one embodiment, a network endpoint (such as an IP phone) connects to a border element via an IP Private Branch Exchange (IP-PBX). For example, as depicted with respect to first enterprise customer network 102, network endpoints 120C are connected to first customer border element 110 via IP-PBX 114 and associated first enterprise customer network communication links 118.

In another embodiment, a network endpoint (such as an ISDN phone) connects to a border element via a TA, a Media Terminal Adapter (MTA), and like access equipment and technologies. For example, as depicted with respect to first enterprise customer network 102, the network endpoints 120D are connected to first customer border element 110 via TA 116 and associated first enterprise customer network communication links 118.

In another embodiment, a network endpoint (such as a computer terminal) connects to a border element directly (without traversing associated TDM-PBX, IP-PBX, or TA equipment). For example, as depicted with respect to first enterprise customer network 102, network endpoints 120A are connected to customer border element 110 directly via one of the first enterprise customer network communication links 118. Although not depicted as traversing a TDM-PBX, IP-PBX, or TA, the directly connected network endpoints 120A may traverse other equipment in order to communicate with a service provider border element, such as a customer managed router, cable modem, DSL service equipment, and the like.

The second enterprise customer network 106 comprises a second customer border element (CBE$_2$) 130 and a plurality of network endpoints 140A-140C (collectively, network endpoints 140) connected via second enterprise customer network communication links 138, as well as intervening equipment. Although not described in detail, those skilled in the art will appreciate that each of the network endpoints 140 located within the second enterprise customer network 106 accesses the service provider network 104 using similar equipment and access technologies described above with respect to the network endpoints 120.

In one embodiment, a network endpoint 140 connects to service provider network 104 through a circuit-switched connection with a border element. In another embodiment, a network endpoint 140 connects to service provider network 104 through an IP connection with a border element. In another embodiment, a network endpoint 140 may connect to a border element using at least one of a Signaling System 7 (SS7) network, a DSL network, a cable network, a TA, a MTA, a customer managed router, a customer managed gateway, a local area network, a frame relay (FR) network, an asynchronous transfer mode (ATM) network and like access technologies. Those skilled in the art will appreciate that numerous other techniques for establishing a connection between a network endpoint and a border element exist in the art.

For example, as depicted with respect to second enterprise customer network 106, the network endpoints 140B are connected to second customer border element 130 via TDM-PBX 132 and associated second enterprise customer network communication links 138. Similarly, the network endpoints 140C are connected to second customer border element 130 via TA 134 and associated second enterprise customer network communication links 138. Similarly, the network endpoints 140A are connected to second customer border element 130 directly via one of the associated second enterprise customer network communication links 138.

Although two enterprise customer networks are depicted, additional enterprise customer networks may be supported by service provider network 104. Although only one customer border element is depicted, additional customer border elements may be deployed within each enterprise customer network. Similarly, although only one TDM-PBX, IP-PBX, and TA are depicted, fewer or more may be deployed depending upon the types of network endpoints deployed within the enterprise customer network (such as TDM phones, IP phones, computers, and the like). Although three network endpoints are depicted in each grouping of the network endpoints, fewer or more network endpoints may be connected to a customer border element through a TDM-PBX, an IP-PBX, or a TA, directly connected to a customer border element, or connected using other access technologies as known in the art.

In order to facilitate communication between network endpoints of an enterprise customer network, the enterprise customer typically subscribes to service plans offered by the service provider. A service plan is a suite of services and features available to each of the network endpoints in the enterprise customer network. Such services include dialing plans, call waiting, call forwarding, teleconferencing, voicemail, and the like. Unfortunately, as described above, dialing plans are typically tightly tied to particular service packages, such that in order for a network endpoint to utilize a particular dialing plan, the enterprise customer must subscribe to the entire service package associated with that particular dialing plan.

Furthermore, such dialing plans available for calls within an enterprise customer network are particular to that enterprise customer network and cannot be used to initiate call requests between distinct enterprise customer networks. As described above, even though distinct enterprise customer networks may be utilizing the same IP network, a call from one enterprise customer network to another enterprise customer network is typically transferred to and routed across an intermediate network, such as a PSTN.

Using the methodologies of the present invention, a network endpoint of one enterprise customer network is able to initiate a call to a network endpoint of another enterprise customer network using a dialing plan mapping. In one embodiment, the dialing plan mapping is formed by mapping a first address mapping to a second address mapping. In one further embodiment, the first address mapping is retrieved from a first dialing plan repository and the second address mapping is retrieved from a second dialing plan repository, where the first and second dialing plan repositories are independently maintained.

A dialing plan mapping comprises a mapping between a first address mapping and a second address mapping. An address mapping (such as the first address mapping, second address mapping, and the like) comprises a mapping of at least one dialing plan to at least one address. As such, a dialing plan mapping comprises a mapping of at least one dialing plan of a first enterprise customer network (the network from which the call request is initiated) to at least one dialing plan of a second enterprise customer network (the network for which the call request is destined).

As depicted in FIG. 1, central dialing plan repository 150 comprises a first dialing plan repository 152 and a second dialing plan repository 154. The first dialing plan repository 152 comprises the dialing plans and corresponding address mappings associated with the first enterprise customer network 102. The second dialing plan repository 154 comprises the dialing plans and corresponding address mappings associated with the second enterprise customer network 106. Although the central dialing plan repository 150 is depicted as comprising two dialing plan repositories, more dialing plan repositories may be included within the central dialing plan repository 150.

Although depicted as respective portions of the central dialing plan repository 150, first dialing plan repository 152 and second dialing plan repository 154 are maintained independently of each other. Since first dialing plan repository 152 is independent of second enterprise customer network 106, only first enterprise customer network 102 has access to the address mappings in the first dialing plan repository 152. Similarly, since the second dialing plan repository 154 is independent of first enterprise customer network 102, only second enterprise customer network 106 has access to the address mappings in the second dialing plan repository 154.

In one embodiment, as depicted in FIG. 1, the central dialing plan repository is implemented as a stand-alone system (illustratively, central dialing plan repository 150) in communication with service provider network 104. As depicted in FIG. 1, central dialing plan repository 150 communicates with service provider network 104 via at least one communication link 156. As such, in this arrangement, each of the network endpoints 120 and network endpoints 140 communicates with central dialing plan repository 150 via service provider network 104.

In another embodiment (not depicted), central dialing plan repository 150 is located in a centralized, shared resource such as a management system, a provider border element, a media gateway, a voice gateway, and like network systems and elements hosted within service provider network 104. In each of these embodiments, the central dialing plan repository 150 includes information storage and processing, translation, and networking resources required to access and utilize dialing plan mappings (and the corresponding dialing plans and address mappings) from the first dialing plan repository 152 and the second dialing plan repository 154.

In one embodiment (not depicted), at least one of first dialing plan repository 152 and second dialing plan repository 154 may be located within first enterprise customer network 102 and second enterprise customer network 106, respectively, within service provider network 104, or remotely located in a remote system. In this embodiment, central dialing plan repository 150 accesses the first dialing plan repository 152 and second dialing plan repository 154 in order to perform the methodologies of the present invention, including the retrieval and correlation of address mappings (and corresponding dialing plans) associated with dialing plan mappings.

In one embodiment, first dialing plan repository 152 has associated with it at least one customer identifier such that although the first dialing plan repository 152 is hosted within (or in communication with) the service provider network 104, first dialing plan repository 152 is uniquely maintained. Similarly, in one embodiment, second dialing plan repository 154 has associated with it at least one customer identifier such that although second dialing plan repository 154 is hosted within (or in communication with) the service provider network 104, the second dialing plan repository 154 is uniquely maintained.

Thus, the present invention obviates the need to maintain a tight link between specific dialing plans and associated service packages, enabling any network endpoint in an enterprise customer network to access any dialing plan at any time in order to initiate a call to any network endpoint of a different enterprise customer network, regardless of the service plans to which the enterprise customers subscribe. As such, in one embodiment, the step of responding to at least one dialing plan request using at least one dialing plan mapping is independent of any service plan.

Figure 2:
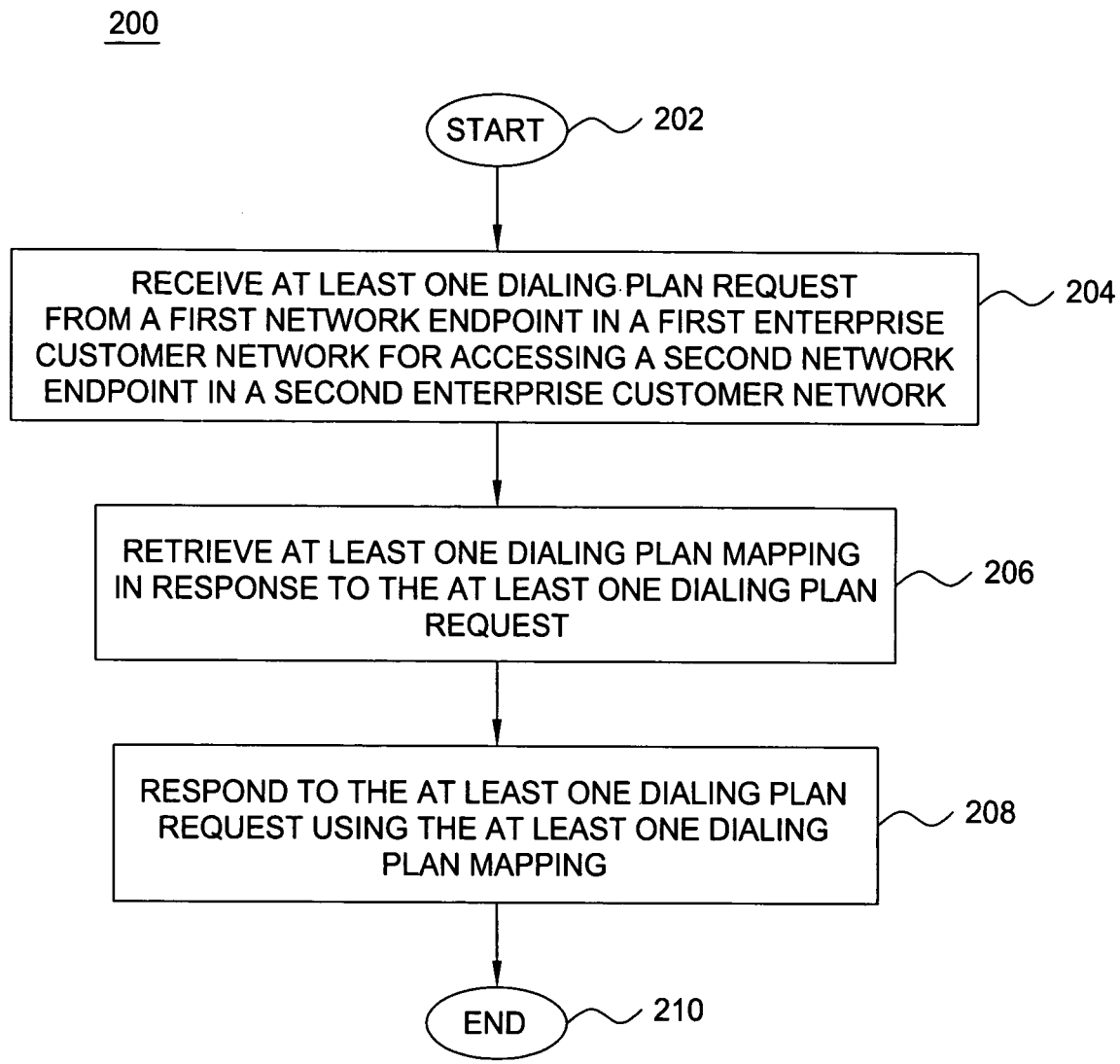
FIG. 2 depicts a flow diagram of a method according to one embodiment of the invention.

FIG. 2 depicts a flow diagram of a method according to one embodiment of the invention. Specifically, the method 200 of FIG. 2 comprises a method of initiating at least one call request from a first enterprise customer network to a second enterprise customer network using at least one dialing plan. The method 200 is entered at step 202 and proceeds to step 204.

At step 204, at least one dialing plan request is received from a first network endpoint in the first enterprise customer network for accessing a second endpoint in the second enterprise customer network. The at least one dialing plan request is received in response to initiation of a call request by the first network endpoint. For example, one of the network endpoints 120B initiates a call request to one of the network endpoints 140B using a dialing plan (four-digit extension dialing, for example).

At step 206, at least one dialing plan mapping is retrieved in response to the at least one dialing plan request. The at least one dialing plan mapping is retrieved from the central dialing plan repository. A dialing plan mapping comprises a mapping between a first address mapping and a second address mapping, where the first address mapping is associated with the first enterprise customer network and the second address mapping is associated with the second enterprise customer network.

In one embodiment, the at least one dialing plan mapping is formed by mapping a first address mapping to a second address mapping, wherein the first address mapping is retrieved from first dialing plan repository 152 and the second address mapping is retrieved from the second dialing plan repository 154. The first address mapping and second address mapping are formed by mapping at least one dialing plan to at least one address, respectively.

At step 208, the at least one dialing plan request is responded to using the at least one dialing plan mapping. In other words, at least one dialing plan mapping, which comprises a mapping of the first address mapping to the second address mapping, is used in order to complete the call request from the first network endpoint to the second network endpoint. The method 200 then proceeds to step 210 where the method 200 ends.

Figure 3:
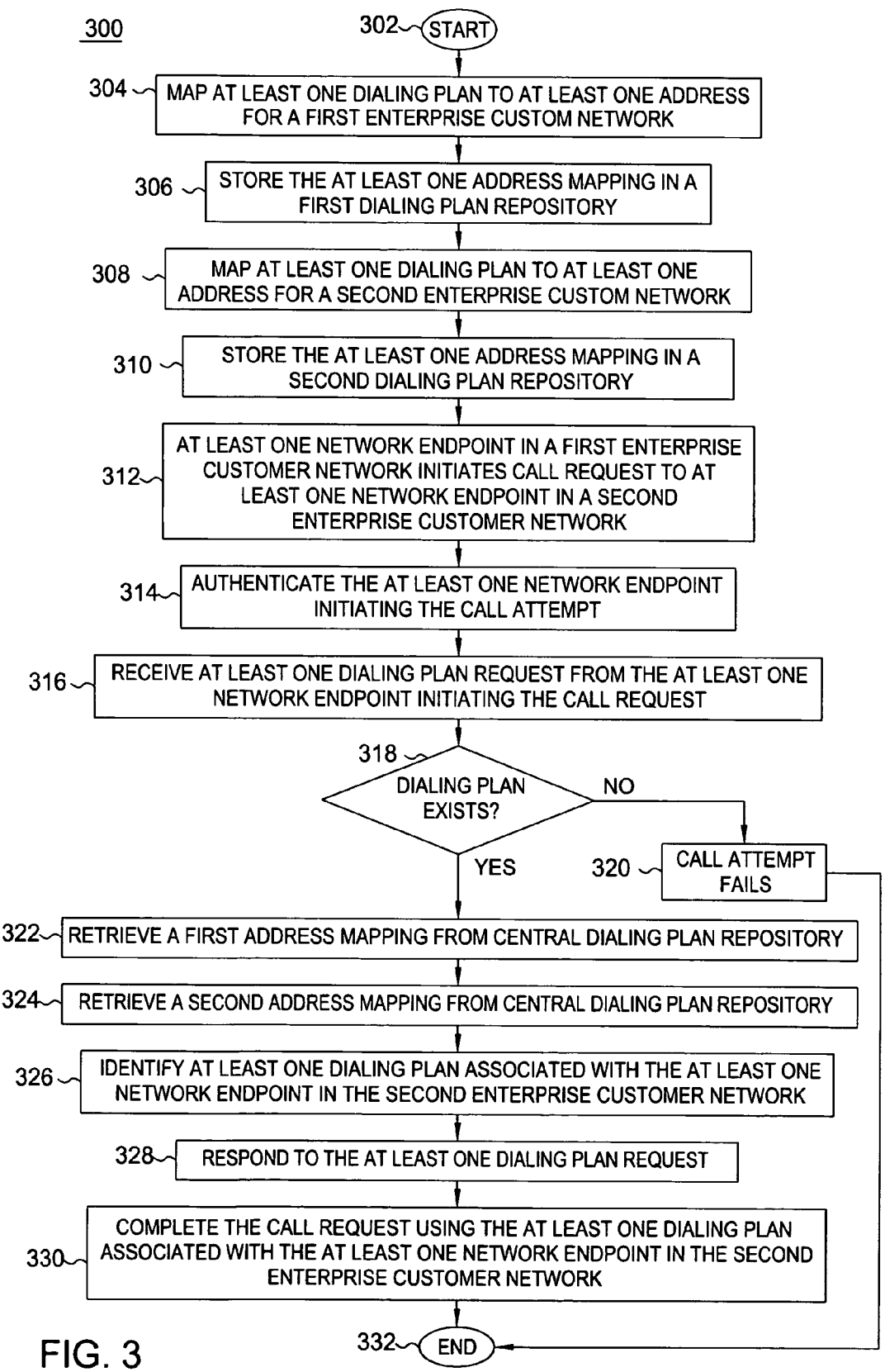
FIG. 3 depicts a detailed flow diagram of the method depicted in FIG. 2.

FIG. 3 depicts a detailed flow diagram of the method depicted in FIG. 2. Specifically, the method 300 of FIG. 3 comprises a detailed version of a method of initiating at least one call request from a first enterprise customer network to a second enterprise customer network using at least one dialing plan. Although depicted as being performed serially, those skilled in the art will appreciate that at least a portion of the steps of method 300 may be performed contemporaneously. The method 300 is entered at step 302 and proceeds to step 304.

At step 304, a dialing plan is mapped to an address for a first enterprise customer network, resulting in an address mapping associated with the first enterprise customer network. At step 306, the address mapping is stored in a first dialing plan repository associated with a central dialing plan repository. At step 308, a dialing plan is mapped to an address for a second enterprise customer network, resulting in an address mapping associated with the second enterprise customer network. At step 310, the address mapping is stored in a second dialing plan repository associated with the central dialing plan repository.

For both the first enterprise customer network and second enterprise customer network, the at least one dialing plan comprises at least one of a reduced number dialing plan, an international dialing plan, and the like. As such, the at least one dialing plan comprises at least one of three-digit extension dialing, four-digit extension dialing, five-digit extension dialing, star-nine dialing (i.e., dial "*9" for an non-enterprise customer or an international endpoint), and the like. In one embodiment, the address is an Internet Protocol (IP) address.

In one embodiment, an address mapping includes a customer identifier for distinguishing between distinct enterprise customer networks. For example the first enterprise customer network (and associated first dialing plan repository) and the second enterprise customer network (and associated second dialing plan repository) may each have an associated customer identifier for distinguishing between those enterprise customer networks. Although two dialing plan repositories are shown, additional dialing plan repositories may be implemented for the first and second enterprise customer networks and for additional enterprise customer networks (not shown).

At step 312, a first network endpoint in a first enterprise customer network initiates a call request to a second network endpoint in a second enterprise customer network. The call request is initiated using a dialing plan. For example, with respect to FIG. 1, assume that a first network endpoint (one of the network endpoints 120B having a phone number of 803-555-4321) initiates a call request to a second network endpoint (one of the network endpoints 140B having a phone number of 732-555-6789) by dialing the four-digit extension (i.e., '6789') of the second network endpoint. In other words, the first network endpoint initiates a call request using four-digit extension dialing.

At step 314, the first network endpoint initiating the call request is authenticated prior to allowing that network endpoint to access the central dialing plan repository. The authentication of the first network endpoint verifies that the user of the first network endpoint is provisioned to access the dialing plan mappings in the central dialing plan repository. At step 316, the dialing plan request is received from the first network endpoint in the enterprise customer network (first enterprise customer network) that initiated the call request. The dialing plan request is received by a system on which the central dialing plan repository is implemented.

At step 318, the system that received the dialing plan request (e.g., the central dialing plan repository 150) determines whether the requested dialing plan that the first network endpoint attempted to use exists. If the dialing plan does not exist, the method 300 proceeds to step 320 (at which point the call request fails), and then proceeds to step 332 where the method 300 ends. For example, if four-digit extension dialing is not a valid dialing plan (does not exist in first dialing plan repository 152 associated with first enterprise customer network 102), dialing the four digit extension (6789) does not provide sufficient information to complete the call request. If the dialing plan does exist, method 300 proceeds to step 322.

At step 322, a first address mapping is retrieved from central dialing plan repository 150 (from memory, a database, or any other suitable component in which the first address mapping is stored, as known in the art) in response to the dialing plan request. The dialing plan used by the first network endpoint to initiate the call request is used to identify a first address mapping. The first address mapping comprises a mapping between the dialing plan used by the first network endpoint to initiate the call request, and an address. In one embodiment, the dialing plan used by the first network endpoint to initiate the call request is located within the first dialing plan repository 152, and as such, the first address mapping is retrieved from the first dialing plan repository 152.

At step 324, a second address mapping is retrieved from central dialing plan repository 150 (from memory, a database, or any other suitable component in which the first address mapping is stored, as known in the art) using the first address mapping retrieved from the central dialing plan repository. The second address mapping associated with the second network endpoint is identified using a dialing plan mapping located within the central dialing plan repository 150 since a dialing plan mapping comprises a mapping between a first address mapping and a second address mapping.

At step 326, the dialing plan associated with the second network endpoint is identified using the second address mapping retrieved from the central dialing plan repository. In one embodiment, the second address mapping retrieved from the central dialing plan repository 150 is retrieved from the second dialing plan repository 154, and comprises a mapping between the dialing plan and an associated address. As such, the dialing plan mapping between the first address mapping and second address mapping is used to identify the second address mapping within the second dialing plan repository, which is in turn used to retrieve the dialing plan from the second dialing plan repository 154.

At step 328, the dialing plan request is responded to using the dialing plan mapping since the at least one dialing plan mapping is used to correlate the first address mapping to the second address mapping, and the second address mapping comprises a mapping from the identified dialing plan to the associated address. Thus, in one embodiment, the dialing plan identified in step 326 is used to respond to dialing plan request. In another embodiment, the address associated with the dialing plan (determined from the second address mapping of the second dialing plan repository) is used to respond to the dialing plan request.

At step 330, the call request is completed using the dialing plan mapping. In one embodiment, the completion of the call request using the dialing plan mapping is performed using the dialing plan associated with the second network endpoint. The call request is completed by signaling the second network endpoint. For example, in continuation of the example, the call request from the first network endpoint to second network endpoint is completed using the four-digit extension dialing. In other words, by dialing the four digit extension (6789), the second network endpoint receives an indication that there is an incoming call (e.g., rings the phone) from first network endpoint.

Although described above with respect to one dialing plan mapping, first address mapping, and second address mapping, the scope of the invention encompasses embodiments in which at least one dialing plan mapping is used to respond to at least one dialing plan request. Similarly, the scope of the invention is meant to encompass embodiments in which a dialing plan mapping comprises a mapping of at least one address mapping (a first address mapping) to at least one other address mapping (a second address mapping). Similarly, the scope of the present invention is meant to encompass embodiments in which at least one dialing plan is mapped to at least one address, thereby resulting in at least one address mapping associated with an enterprise customer network.

Although the first enterprise customer network 102 cannot access the second dialing plan repository 154 and second enterprise customer network 106 cannot access the first dialing plan repository 152, central dialing plan repository 150 may access both the first dialing plan repository 152 and the second dialing plan repository 154 (either singly or in combination) in order to respond to at least one dialing plan request initiated from at least one network endpoint. Although only described with respect to a call request from a first enterprise customer network endpoint to a second enterprise customer network endpoint, the methodology of the present invention may be performed in order to initiate a call request between numerous enterprise customer network endpoints in any number of different enterprise customer networks.

Figure 4:
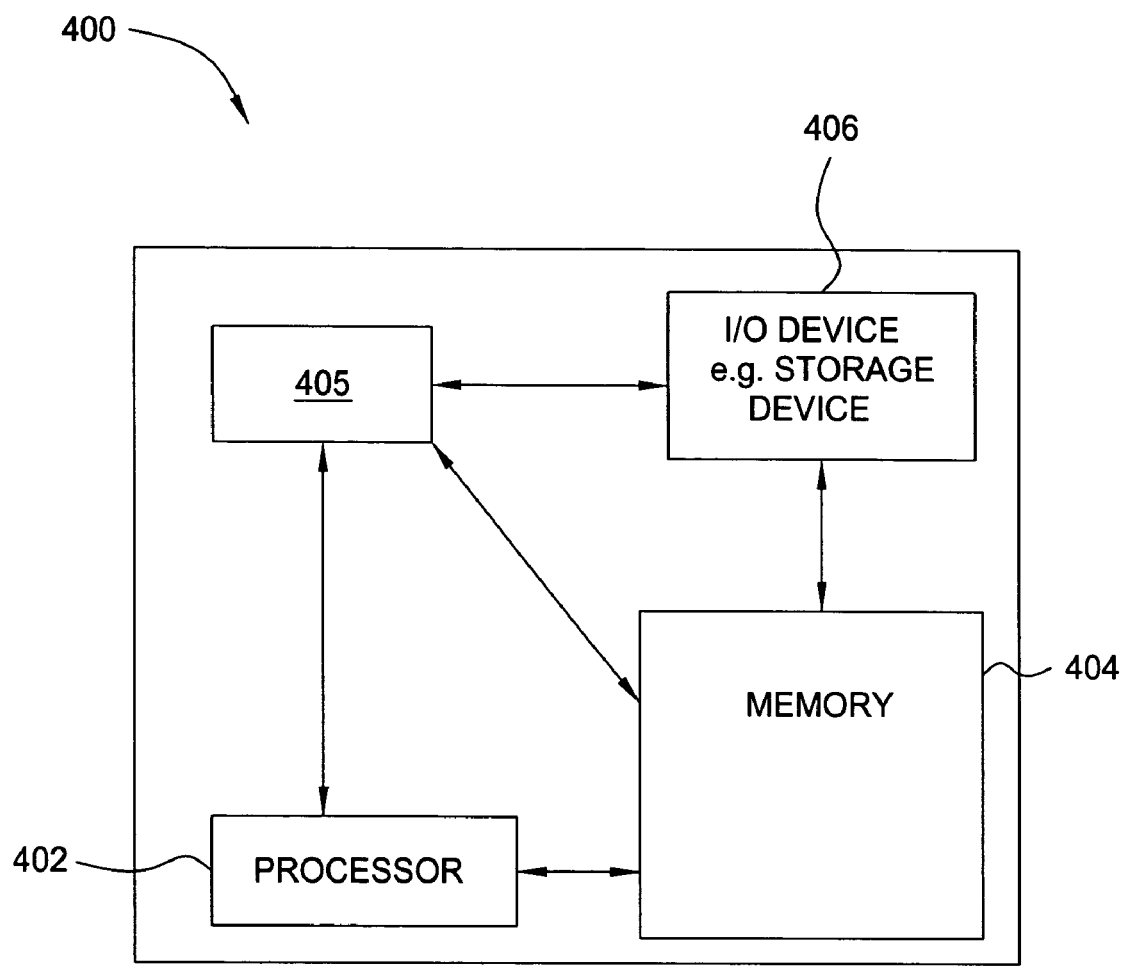
FIG. 4 depicts a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a central dialing plan repository module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present central dialing plan repository module or process 405 can be loaded into memory 404 and executed by processor 402 to implement the functions as discussed above. As such, the present central dialing plan repository process 405 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for processing a call request from a first enterprise customer network to a second enterprise customer network using at least one dialing plan, comprising:

receiving at least one dialing plan request from a first network endpoint in said first enterprise customer network for accessing a second network endpoint in said second enterprise customer network;

retrieving at least one dialing plan mapping in response to said at least one dialing plan request, wherein said at least one dialing plan mapping is formed by mapping a first address mapping to a second address mapping, wherein said first address mapping is associated with said first enterprise customer network and said second address mapping is associated with said second enterprise customer network; and responding to said at least one dialing plan request using said at least one dialing plan mapping.

2. The method of claim 1, wherein said at least one dialing plan mapping is retrieved from at least one central dialing plan repository.

3. The method of claim 2, wherein said at least one central dialing plan repository comprises a plurality of private dialing plan repositories associated with a respective plurality of enterprise customer networks.

4. The method of claim 1, wherein said first address mapping is retrieved from a first dialing plan repository and said second address mapping is retrieved from a second dialing plan repository.

5. The method of claim 4, wherein said first dialing plan repository and said second dialing plan repository are maintained independently.

6. The method of claim 5, wherein said first address mapping is formed by mapping at least one dialing plan to at least one address and said second address mapping is formed by mapping at least one dialing plan to at least one address.

7. The method of claim 6, wherein said at least one dialing plan is at least one of: a reduced number dialing plan or an international dialing plan.

8. The method of claim 7, wherein said reduced number dialing plan enables said call request to be completed using less than seven digits of a phone number.

9. The method of claim 7, wherein said international dialing plan enables said call request to be completed using less than seven digits of a phone number.

10. The method of claim 6, wherein said at least one address is an Internet Protocol address.

11. The method of claim 1, wherein said responding to said at least one dialing plan request comprises completing said call request using said at least one dialing plan mapping.

12. The method of claim 11, wherein said call request is initiated using at least one of: at least one network endpoint in said first enterprise customer network or at least one network endpoint in said second enterprise customer network.

13. The method of claim 12, wherein said at least one network endpoint comprises at least one of: a Time Division Multiplexing (TDM) phone, an Internet Protocol (IP) phone, an Integrated Services Digital Network (ISDN) phone, or a computer.

14. The method of claim 1, further comprising:
authenticating at least one network endpoint prior to allowing said at least one network endpoint to retrieve said at least one dialing plan mapping from at least one central dialing plan repository.

15. The method of claim 1, further comprising:
registering at least one additional network endpoint for retrieving said at least one dialing plan mapping from at least one central dialing plan repository.

16. The method of claim 1, wherein said responding to said at least one dialing plan request using said at least one dialing plan mapping is independent of any service plan associated with said at least one dialing plan mapping.

17. A computer readable medium storing a software program, that, when executed by a computer, causes the computer to perform a method comprising:
receiving at least one dialing plan request from a first network endpoint in a first enterprise customer network for accessing a second network endpoint in a second enterprise customer network;
retrieving at least one dialing plan mapping in response to said at least one dialing plan request, wherein said at least one dialing plan mapping is formed by mapping a first address mapping to a second address mapping, wherein said first address mapping is associated with said first enterprise customer network and said second address mapping is associated with said second enterprise customer network; and
responding to said at least one dialing plan request using said at least one dialing plan mapping.

18. The computer readable medium of claim 17, wherein said responding to said at least one dialing plan request comprises completing at least one call request.

19. An apparatus for initiating at least one call request from a first enterprise customer network to a second enterprise customer network, comprising:
means for receiving at least one dialing plan request from a first network endpoint in said first enterprise customer network for accessing a second network endpoint in said second enterprise customer network;
means for retrieving at least one dialing plan mapping in response to said at least one dialing plan request, wherein said at least one dialing plan mapping is formed by mapping a first address mapping to a second address mapping, wherein said first address mapping is associated with said first enterprise customer network and said second address mapping is associated with said second enterprise customer network; and
means for responding to said at least one dialing plan request using said at least one dialing plan mapping.

* * * * *